Jan. 31, 1933.                S. RUBEN                1,895,685
ELECTRIC CURRENT RECTIFIER
Filed Nov. 16, 1929
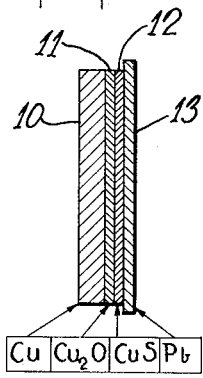
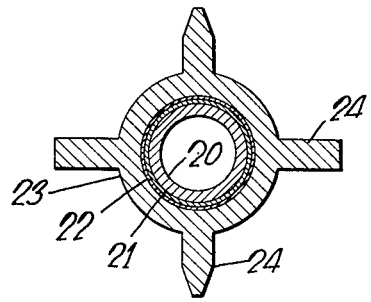
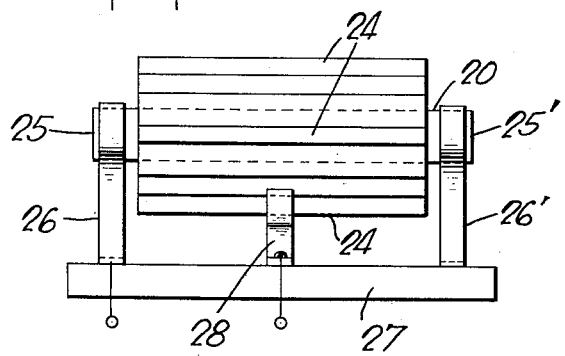
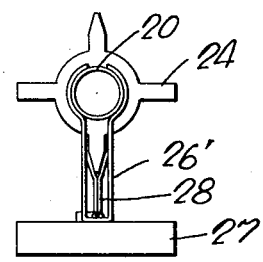
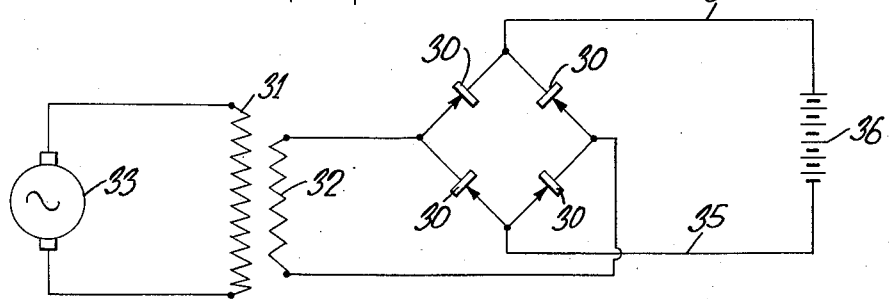
INVENTOR.
Samuel Ruben
BY Warfield & Watson
ATTORNEYS.

Patented Jan. 31, 1933

1,895,685

UNITED STATES PATENT OFFICE

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE

ELECTRIC CURRENT RECTIFIER

Application filed November 16, 1929. Serial No. 407,777.

This invention relates to electric current rectifiers and the like which employ electrode elements of the dry type, and more particularly to rectifiers of this character which employ electrode elements having a preformed rectifying junction between its metal base and an adhering compound thereof, such as an oxide.

Rectifiers of this type are known in which the electrode elements are composite bodies of copper coated with an adhering body of oxide in a manner which develops a rectifying junction at the metallic surface that is overlaid by the compound. Such rectifiers depend for their operation upon the asymmetric resistance characteristics which obtain at this junction.

The present invention has for its object generally the provision of an improved device of the character indicated, which is efficient, economical and readily manufactured.

More specifically, it is an object to provide a rectifying electrode element which is relatively more suitable than the devices of the prior art, for example, one which is capable of withstanding higher operating voltage and at the same time has a more uniform distribution of current at the rectifying junction.

It is also an object to provide a rectifying electrode element which is adapted for operating under a greater range of differences of impressed potential than is applicable to elements of copper which are coated with cuprous oxide.

It is still a further object to provide a unitary electrode element which is improved so as to have increased asymmetric conductivity through a plurality of junctions in series for example, the asymmetric conductivities of both cuprous oxide and cupric sulphide junctions.

Other objects of the invention will in part be obvious and will in part appear hereinafter.

This case is a continuation, in part, of my co-pending applications, Serial No. 283,217, filed December 6, 1927, and Serial No. 323,084, filed December 1, 1928.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawing, in which:

Fig. 1 is a cross sectional view of an electrode element of the present invention enlarged to show schematically the component parts thereof;

Fig. 2 is a sectional view of a convenient embodiment of a rectifying device constructed in accordance with the present invention;

Fig. 3 is an end elevation, showing the same mounted on a suitable support or base;

Fig. 4 shows the rectifying element and base in side elevation; and

Fig. 5 shows schematically an electric system in which the rectifier of the present invention is arranged for effecting full wave rectification.

Referring now to the drawing, and particularly to Fig. 1, 10 represents a plate of metallic copper having a surface coated with an oxygen compound of copper, shown at 11, of a character adapted to produce rectification, for example, cuprous oxide ($Cu_2O$). This compound may be on more than one surface, but for the purpose of the present invention the one surface which is actively employed in rectification is all that is shown as having this coating. Overlying or superposed upon this coating and in intimate contact therewith is a thin layer of a second compound shown at 12, of an element heavier than oxygen, adapted to react by substitution with the oxygen compound in case of undue heating, or break-down. A suitable stable compound of this character is a metallic compound with an element of the sulphur family, for example, a sulphide, selenide, or telluride. Cupric sulphide (CuS) may be mentioned as an instance of a commercially suitable compound of this character.

Against the surface of the second or reacting compound is pressed a plate of relatively inert metal 13, which is provided to make good electrical contact with the second compound. Such metal may be of lead, tin, zinc, or an alloy thereof. Lead, however, is preferred and its presence is indicated in the preferred embodiment shown in Fig. 1 by the legend imposed.

The layer of reacting compound in accordance with the present invention, is made to have a very intimate contact with the underlying layer, which is achieved through the agency of chemical union. Where this reacting layer is cupric sulphide, this is brought about by compounding it so as to contain a small amount of free sulphur, for example, 5% of free sulphur. In order to effect the desired intimate union between the layers of cupric sulphide and cuprous oxide, the copper body with the two layers is heated to a sufficient temperature to bond the layers. This produces a surface reaction between the sulphide and oxide. As a result, it can be noted that a very thin layer of a substitution compound is formed having a thickness approximating one-thousandth of an inch. As a result the contact resistance, which obtains at the junction of the layers of oxide and of sulphide, is reduced materially and is of a character such that the application of pressure to the element no longer changes its resistance characteristics. The compound electrode element thus produced may be assembled in rectifiers without special regard to operating pressure; all that is required, being a good contact.

Compound rectifying electrodes produced in this manner also have substantially uniform distribution characteristics for the current over the surface at the junction, consequently uniform current densities are readily obtained in practice by the use of the present invention and the tendency for the current to localize over the surface is substantially avoided. The intimate union between the sulphide and the oxide layers, also results in changing the voltage characteristics of the electrode from that of a plain copper-oxide-coated electrode to have operating characteristics whereby such electrodes are substantially independent of the voltage and operate over a relatively wide range of voltage. Higher impressed operating voltages as a consequence may be employed.

The intimate union of the reacting compound with the cuprous oxide, also results in improved self-healing characteristics, whereby the rectifying element of the present invention is highly resistant to the destructive effects of elevated potential and short circuits. When currents are passing under these conditions, further chemical reaction of direct substitution readily takes place. In the case of the specific reacting compound here considered, there is a reaction between the cuprous oxide and the cupric sulphide forming cuprous sulphide which is then converted into cupric oxide by reaction with the air. It is thus seen that the cupric sulphide provided intimately on the cuprous oxide, prevents a direct reduction of the cuprous oxide to copper metal and a cause of failure is thereby avoided.

The improved operating characteristics provided by the rectifying electrode of the present invention, is thus adopted for normal operation at relatively high voltages and at relatively high current densities. To adopt electrodes of the present invention, more specifically to withstand operation at high current densities, the electrode elements are preferably given a physical form which have relatively high heat radiation characteristics. A suitable physical form for this purpose is illustrated in Figs. 2, 3 and 4, where it is seen that the base plate of copper, shown at 20, is made into tubular form, the coatings being placed on the outer side, the cuprous oxide coating being indicated at 21; the cupric sulphide layer being indicated at 22. The backing of inert metal is shown at 23 and forms the outermost cylindrical envelope; this envelope being provided with a plurality of radially extending heat radiating fins 24.

A compound rectifying electrode having such physical form, is readily mounted for rectifying service by prolonging the ends of the copper tube beyond the ends of the inert metallic envelope, so that they may be used both as terminals and as supports for the compound electrode. An arrangement for this purpose is shown in Fig. 4, where 25 and 25' denote projecting ends of the copper tube which are supported respectively in clip-like brackets 26 and 26', the latter being secured on an insulating base 27. This insulating base also has a central clip-like bracket 28 disposed to engage with one or more fins 24 of the inert metallic tube. The bracket 28 and the end supporting bracket are thus adapted to serve as terminals for the present rectifying electrode, for example, those shown at 27 and 28. Such rectifying electrode is adapted to be connected in any convenient electric system arranged to supply rectified current, for example in a bridge-circuit as shown in Fig. 5 where the rectifying cells are symbolically depicted at 30 as disposed respectively in the four arms of a Wheatstone bridge adapted to supply full-wave rectified current. Across one diagonal of this bridge is impressed an alternating current supply, here indicated as the secondary 32 of a transformer whose primary is shown at 31; this latter being supplied by alternating current from any convenient commercial source, such as a 110-volt-60-cycle source, symbolically depicted at 33. Across the other diagonal of the bridge is connected the direct current supply circuit comprising conductors 34 and 35 leading to a current consuming device 36.

In operation, where the electrode elements, depicted at 30, are of the character shown in Figs. 3 and 4, then the direct current obtained may be of relatively high voltage and at a relatively high current density. The device may be turned off and on at will without interfering at all with the operating characteristics, the heat generated being readily dissipated through the fins here provided. The rectifying device will operate substantially unimpaired after being subject to short circuits or similar transients, by reason of the self-healing characteristics hereby imparted.

Any convenient process for manufacturing the compound rectifying electrodes of the present invention may be employed which provides intimate union between the outer layer and the subjacent layer of cuprous oxide. The following, however, is preferred, since it results in a copper plate to which the cuprous oxide is also intimately joined.

A copper plate or body of a shape suitable for the electrode is cleaned and then exposed for a short period to the vapors of sulphur, so as to be thinly coated with a layer of sulphide. The body thus slightly sulphided is then placed in a furnace and surrounded with an oxidizing atmosphere and heated to substantially 1000° C. for a period depending upon the thickness of the oxide layer which it is desired to produce, for example, a period of 20 minutes where it is desired to produce an oxide layer of about 5 mils in thickness. When thus oxidized, the body is taken from the furnace and quenched in a 25% solution of hydrochloric acid. This quenching produces a substantially uniformly distributed layer of crystals over the surface of the copper, the outermost layer being crystals of cupric oxide, while that beneath is a relatively thick layer of cuprous oxide crystals. In order to remove the outermost layer of oxide, the coated copper body is then treated for a short time in nitric acid. This removes the cupric oxide and leaves a surface which may be readily coated with cupric sulphide material in a manner so as to be intimately joined to the underlying layer. A preferred method for accomplishing this latter, is as follows:

Copper sulphide powder which contains an excess of sulphur is first prepared by mixing together copper powder and flowers of sulphur in excess of that required for the direct chemical union of copper with sulphur to form cupric sulphide; this is then heated until the mass glows, after which it is ground until fine enough to pass through a 200 mesh screen. 5% of sulphur is again added and the mixture ball-milled for several hours in a 15% solution of gum arabic. The product thus obtained is adapted to be applied by means of a brush to the surface of the cuprous oxide. The body thus coated is then heated to produce the chemical reaction which effects the intimate union between the sulphide coating and the oxide coating, the temperature for this reaction being substantially 120° C. as above indicated. If there is a greater excess of sulphur in the coating painted on the electrode than is required, such sulphur will come out through the cupric sulphide layer being cemented on the oxide, so that there is a fine formation of sulphur crystals on the outside thereof which may be ground off. Thus, there is exposed an active surface of cupric sulphide on cuprous oxide which when backed by inert metal has the rectifying characteristics desired.

Where the electrode element is in tubular form, the backing of inert metal is fitted about the same in any convenient manner adapted to produce a good contact, for example, cast on the same. This form is preferred where the electrode elements have the form illustrated in Figs. 2, 3 and 4 of the drawing, since it insures good contact both initially and during operation.

Since certain changes may be made in the above construction and different embodiments of the invention could be made without departing from the scope thereof, it is intended that all matter contained in the above description, or shown in the accompanying drawing, shall be interpreted as illustrative and not in a limiting sense.

Having described my invention, what I claim as new and desire to secure by Letters Patent is:

1. In dry rectifiers and the like, a composite electrode element comprising a body of copper having an adhering layer of cuprous oxide, and a layer of a metallic compound of an element of the sulphur family adapted for a substitutionary reaction with said cuprous oxide layer and the forming of a rectifying junction therewith.

2. In dry rectifiers and the like, a composite electrode element comprising a body of copper having an adhering layer of cuprous oxide, and an intimately joined layer of a substitutionary reacting copper compound of an element of the sulphur family adapted to form a rectifying junction with said cuprous oxide layer.

3. In dry rectifiers and the like, a composite electrode element comprising a body of copper having an adhering layer of cuprous oxide, and an intimately joined layer of a compound of the sulphur family overlying said cuprous oxide layer.

4. In dry rectifiers and the like, a composite electrode element comprising a body of copper having an adhering layer of cuprous oxide, and a layer of a metallic compound of an element of the sulphur family joined to said layer of cuprous oxide by an intersurface chemical union.

5. In dry rectifiers and the like, a composite electrode element comprising a body of copper having an alhering layer of cuprous oxide, and a layer of a metallic sulphide intimately joined to the layer of cuprous oxide over the active surface of the latter.

6. In dry rectifiers and the like, a composite electrode element comprising a body of copper having an adhering layer of cuprous oxide, and a layer of a sulphide of copper overlying the active surface of said cuprous oxide layer and joined thereto by intersurface chemical union.

7. In dry rectifiers and the like, a composite electrode element comprising a body of copper having an adhering layer of cuprous oxide, and a layer of cupric sulphide overlying the active surface of said cuprous oxide layer; said layer being intimately united by intersurface chemical union.

8. In dry rectifiers and the like, a composite electrode element comprising a body of copper having an adhering layer of cuprous oxide, and a layer of a sulphide of copper overlying the active surface of said cuprous oxide layer, said sulphide layer having associated therewith an agent dispersed in said cupric sulphide layer adapted to induce chemical union between said layers at their junction.

9. In dry rectifiers and the like, a composite electrode element comprising a body of copper having an adhering layer of cuprous oxide, and a layer of cupric sulphide overlying the active surface of said cuprous oxide layer, said sulphide layer having associated therewith a relatively small quantity of free sulphur in a manner adapted to induce chemical union between said layers at their junction.

10. In dry rectifiers and the like, a composite electrode element comprising a body of copper having an adhering layer of cuprous oxide, a layer of cupric sulphide overlying the active surface of said cuprous oxide layer, and a trace of free sulphur associated with said cupric sulphide whereby there is induced an intimate union between said layers at their junction, having substantially negligible contact resistance.

11. A process of producing composite rectifying electrodes having a plurality of rectifying junctions which comprises coating a copper body with a layer of cuprous oxide of desired thickness, surfacing the latter with a layer of a reacting metallic compound of an element of the sulphur family adapted to form a rectifying junction therewith, and inducing an intimate union between said layer whereby the contact resistance thereat is substantially reduced.

12. A process of producing composite rectifying electrodes having a plurality of rectifying junctions which comprises coating a copper body with a layer of cuprous oxide of desired thickness, surfacing the latter with a layer of a reacting compound of an element of the sulphur family adapted to form a rectifying junction therewith, and inducing an intersurface chemical union between said layers.

13. A process of producing composite rectifying electrodes having a plurality of rectifying junctions which comprises coating a copper body with a layer of cuprous oxide of desired thickness, surfacing the latter with a layer of a reacting metallic compound of the sulphur family adapted to form a rectifying junction therewith, and heating said body when coated in a manner and to a temperature adapted to produce a surface chemical union between said layers.

14. A process of producing composite rectifying electrodes having a plurality of rectifying junctions which comprises coating a copper body with a layer of cuprous oxide of desired thickness, surfacing the latter with a layer of a reacting compound of sulphur adapted to form a rectifying junction therewith, and heating said body to a temperature of approximately 120° C.; there being a trace of free sulphur in said cupric sulphide layer.

15. A process of producing a copper oxide coated body adapted to be further coated with a reacting layer which comprises heating a body of clean copper in an oxidizing atmosphere at 1000° C. for a period sufficient to produce an oxide layer of desired thickness, quenching in a suitable solution of hydrochloric acid, and then removing the exterior with nitric acid.

16. A process of producing a copper oxide coated body adapted to be further coated with a reacting layer which comprises heating a body of clean copper in an oxidizing atmosphere at 1000° C. for a period sufficient to produce an oxide layer of desired thickness, quenching in a 25 percent solution of hydrochloric acid, and thereafter removing the exterior coating of cupric oxide.

In testimony whereof I affix my signature.

SAMUEL RUBEN.